United States Patent
Jamison, IV et al.

(10) Patent No.: US 7,617,207 B2
(45) Date of Patent: Nov. 10, 2009

(54) CONTACT RELATIONSHIP SYSTEMS AND METHODS

(75) Inventors: William Edward Jamison, IV, Centerville, OH (US); Paul James Militello, Centerville, OH (US); Alagirisamy Ayyalusamy, Centerville, OH (US)

(73) Assignee: Wysitech, Inc., Dayton, OH (US)

( * ) Notice: Subject to any disclaimer, the term of this patent is extended or adjusted under 35 U.S.C. 154(b) by 229 days.

(21) Appl. No.: 11/580,172

(22) Filed: Oct. 12, 2006

(65) Prior Publication Data

US 2008/0091653 A1    Apr. 17, 2008

(51) Int. Cl.
G06F 17/30    (2006.01)
(52) U.S. Cl. .................. 707/5; 707/104.1
(58) Field of Classification Search .......... 707/1, 707/100, 2–6, 102, 5, 104.1
See application file for complete search history.

(56) References Cited

U.S. PATENT DOCUMENTS

| | | | |
|---|---|---|---|
| 6,005,597 A | 12/1999 | Barrett et al. | |
| 6,732,092 B2 | 5/2004 | Lucas et al. | |
| 7,451,161 B2 * | 11/2008 | Zhu et al. | 707/104.1 |
| 2003/0065649 A1 | 4/2003 | Lucas et al. | |
| 2007/0073549 A1 * | 3/2007 | Terrill et al. | 705/1 |
| 2007/0162458 A1 * | 7/2007 | Fasciano | 707/10 |
| 2007/0233730 A1 * | 10/2007 | Johnston | 707/104.1 |
| 2008/0010598 A1 * | 1/2008 | Smilowitz et al. | 715/745 |

* cited by examiner

Primary Examiner—Cheryl Lewis
(74) Attorney, Agent, or Firm—Dinsmore & Shohl LLP

(57) ABSTRACT

The invention generally relates to systems and methods for establishing and managing relationships with contacts. The contact relationship systems generally include databases for storing profile data, retrieved information and correspondence with contacts. The contact relationship systems may also include nurture level indicators for displaying actual frequency of correspondence with a contact. Methods for managing relationships with contacts include storing retrieved information and correspondence between a user and a contact, matching retrieved information to the contact, providing nurture level indicators changeable according to actual frequency of correspondence with the contact.

18 Claims, 10 Drawing Sheets

53
49
67

»My Contacts »Joseph Kustomer                                    Setup   Help   Feedback   Logout

Joe User

○ My Contacts
   New Contact
   Import Contacts
Opportunities
Article Search
Setup
Company Settings
Help

54

Quick Search
Name or Account
[          ]
[ Search ]

Quick Add
First Name
[          ]
Last Name
[          ]
Company
[          ]
Business Phone
[          ]
Email
[          ]

[ Add Contact ]

Name            Mr. Joseph Kustomer
Title           President                     ←—55
Company         Kustomer, Inc.
Business Phone
Email           kustomer@kustinc.com          70
Secondary Email
┌─Business Address─────────────┐
│ 2334 Main Street             │
│ Chicago, Illinois            │
└──────────────────────────────┘
┌─Home Address─────────────────┐
│                              │
└──────────────────────────────┘
┌─Notes────────────────────────┐
│ Click to add notes.          │
└──────────────────────────────┘

50   58    [ Edit ]  [ Delete ]  [ Print ]

CALL SCHEDULE                                    75
Call Target  Potential Sale (1 call every 1 Month)
Next Contact  ☺ 1 month(s) —76
Call Goal    (1 of 1)
Last Contact  Today (03:45 PM EDT) —73
Nurture
Level        ▬▬▬▬▬● —74    —72
(Edit Schedule) (Reset Schedule) (Clear Schedule)

BIRTHDAYS AND ANNIVERSARIES           —79
*You have not added any important dems for this contact.*
(Add New)

Articles

| Rating | Title | Age | Source | Query | Actions |
|---|---|---|---|---|---|
| 1. ◇|★★★★ | Drivers in head-on upgraded | 1 day(s) | News: Police Roundup--Jo... | corvette | 🗎 / ✗ / ✉ |
| 2. ◇|★★★★ | Driving in a dream | 1 day(s) | Business--MyrtleBeachOnli... | corvette | 🗎 / ✗ / ✉ |
| 3. ◇|★★★★ | Porsche 911 Turbo: The tasteful way to blow your... | 2 day(s) | detnews.com - Drive | corvette | 🗎 / ✗ / ✉ |
| 4. ◇|★★★★ | Archive: Corvette and Porsche Controversy | 3 day(s) | Motor Trend RSS | corvette | 🗎 / ✗ / ✉ |

(View all articles)

Activities

| | Status | Date | Notes | |
|---|---|---|---|---|
| 1. | 🕿 Complete | Today(03:45 PM EDT) | Phone Call: Conference call to finalize Joe's requirements | ✗ |
| 2. | 🕿 Complete | 21 day(s) (8/7/06) | Phone Call: Requirements meeting. | ✗ |
| 3. | 🕿 Complete | 1 month(s) (7/26/06) | Phone Call: Received verbal commitment. | ✗ |
| 4. | 🕿 Complete | 1 month(s) (7/17/06) | Phone Call: Checked-in to get a status update on the proposal. | ✗ |
| 5. | 👤 Complete | 1 month(s) (7/10/06) | In Person: Visited Joe at his office and made a proposal; | ✗ |
| 6. | ✉ Complete | 2 month(s) (6/14/06) | Email: Hey Joe, I found this article and thought you might enjoy it. Archive; Corvette and... | ✗ |
| 7. | 🕿 Complete | 3 month(s) (5/10/06) | Phone Call: Called Joe to follow up after our introduction at the conference. | ✗ |
| 8. | 👤 Complete | 3 month(s) (5/3/06) | In Person: Met Joe for the first time. Introduced by Roger Federov at the conference in L... | ✗ |

(Add New Activity) (Manage Activities)

59

Queries

| Name | Query | Rated | Total | Notify Me | Actions |
|---|---|---|---|---|---|
| 1. "chilean wine" | "chilean wine" | 0 | 12 | Never | ✗ /Disable/Edit |
| 2. corvette | corvette-club | 0 | 20 | Never | ✗ /Disable/Edit |

56

(Add New Query) (Manage Queries)

Fig. 4

| Joe User | » My Contacts » Joseph Customer » Articles | | | Setup  Help  Feedback  Logout |
|---|---|---|---|---|
| ⌧ My Contacts | Record  Email  Delete | | | |
| New Contact | | | | |
| Import Contacts | | | | 36 |
| Opportunities | | | | |
| Article Search | Rating | Title | Age | Source |
| Setup | "chilean wine" - [edit] [delete] | | | Switch To Summary View / Delete All Articles |
| Company Settings | ☐1. ⊘│☆☆☆☆☆ ⌕Chilean Carmenere and Cabernet Sauvignon Compleme... | | 13 day(s) | PR Newswire: All Releases  ▣/⊠/✗ |
| Help | ☐2. ⊘│☆☆☆☆☆ ⌕Russian whiskey drinkers left high and dry | | 24 day(s) | Scotsman.com News – Intern...  ▣/⊠/✗ |
|  | ☐3. ⊘│☆☆☆☆☆ ⌕Russia's drinkers fret in face of alcohol crises | | 24 day(s) | Reuters: World  ▣/⊠/✗ |
| Quick Search | ☐4. ⊘│☆☆☆☆☆ ⌕Chilean Sauvignon Blanc and Chardonnay Enhance Sum... | | 2 month(s) | PR Newswire: All Releases  ▣/⊠/✗ |
| Name or Account | ☐5. ⊘│☆☆☆☆☆ ⌕Food Fight | | 2 month(s) | OpinionJournal.com  ▣/⊠/✗ |
| [          ]  Search | ☐6. ⊘│☆☆☆☆☆ ⌕Herhold: We can't afford subsidy for Trader Joe's | | 2 month(s) | Opinion: Scott Herhold -- Ne...  ▣/⊠/✗ |
|  | ☐7. ⊘│☆☆☆☆☆ ⌕Going global not just for big business | | 3 month(s) | InsideBayArea.com: Top Tri-...  ▣/⊠/✗ |
| Quick Add | ☐8. ⊘│☆☆☆☆☆ ⌕Wines of Chile Premiers Next Generation of Wines at As... | | 3 month(s) | PR Newswire: All Releases  ▣/⊠/✗ |
| First Name | ☐9. ⊘│☆☆☆☆☆ ⌕Vina Concha y Toro Reports Fourth Quarter and Year 20... | | 6 month(s) | PR Newswire: All Releases  ▣/⊠/✗ |
| Last Name | ☐10. ⊘│☆☆☆☆☆ ⌕Chile's Colchagua Valley Awarded Wine Enthusiast's Wi... | | 6 month(s) | PR Newswire: All Releases  ▣/⊠/✗ |
| Company | ☐11. ⊘│☆☆☆☆☆ ⌕South America Cruise Program Expands – Holland Ameri... | | 6 month(s) | PR Newswire: All Releases  ▣/⊠/✗ |
| Business Phone | ☐12. ⊘│☆☆☆☆☆ ⌕Wines of Chile Embarks on Its Second Annual National T... | | 6 month(s) | PR Newswire: All Releases  ▣/⊠/✗ |
| Email | Can't find what you are looking for? Refine this query or Add a new one for Joseph Kustomer | | | |
| Add Contact | corvette - [edit] [delete] | | | Switch To Summary View / Delete All Articles |
|  | ☐1. ⊘│☆☆☆☆☆ ⌕Drivers in head-on upgraded | | 1 day(s) | News: Police Roundup -- Jou...  ▣/⊠/✗ |
|  | ☐2. ⊘│☆☆☆☆☆ ⌕Driving in a dream | | 1 day(s) | Business -- MyrtleBeachOnlin...  ▣/⊠/✗ |
|  | ☐3. ⊘│☆☆☆☆☆ ⌕Porsche 911 Turbo: The tasteful way to blow your mind | | 2 day(s) | detnews.com – Drive  ▣/⊠/✗ |
|  | ☐4. ⊘│☆☆☆☆☆ ⌕Archive: Corvette and Porsche Controversy | | 3 day(s) | Motor Trend RSS  ▣/⊠/✗ |
|  | ☐5. ⊘│☆☆☆☆☆ ⌕2006 Mazda ZOOM-ZOOM Live Tour | | 3 day(s) | Motor Trend RSS  ▣/⊠/✗ |
|  | ☐6. ⊘│☆☆☆☆☆ ⌕The Asphalt Jungle: Star Search | | 3 day(s) | Motor Trend RSS  ▣/⊠/✗ |
|  | ☐7. ⊘│☆☆☆☆☆ ⌕New Driver for Volkswagen Pairing For "Dakar" | | 3 day(s) | Motor Trend RSS  ▣/⊠/✗ |
|  | ☐8. ⊘│☆☆☆☆☆ ⌕Formula One World Champion Mike Hakkinen is Ambass... | | 3 day(s) | U.S. Newswire Releases  ▣/⊠/✗ |
|  | ☐9. ⊘│☆☆☆☆☆ ⌕Video from Medialink: The Camaro Concept Car: The Cr... | | 3 day(s) | Motor Trend RSS  ▣/⊠/✗ |
|  | ☐10. ⊘│☆☆☆☆☆ ⌕Spied: The Ferrari Enzo effect | | 3 day(s) | Motor Trend RSS  ▣/⊠/✗ |
|  | ☐11. ⊘│☆☆☆☆☆ ⌕Spied: Audi Roadjet Equals A5 | | 3 day(s) | Motor Trend RSS  ▣/⊠/✗ |
|  | ☐12. ⊘│☆☆☆☆☆ ⌕Road Test: 2006 Hummer H3 vs. 2006 Jeep Liberty Rene... | | 3 day(s) | PR Newswire: All Releases  ▣/⊠/✗ |
|  | ☐13. ⊘│☆☆☆☆☆ ⌕Stolen Corvette Returned After 37 Years, Restored and... | | 3 day(s) | PR Newswire: All Releases |

| | |
|---|---|
| New Activity | |

*Enter a new activity for Joseph Kustomer. Activities can be used to schedule events that will take place in the future, or record events that have already occurred.*

| | | |
|---|---|---|
| Date/Time | 5/25/2006  🗐  2 PM ▼  :00 ▼  Set to Now | |
| Activity | Phone Call ▼ | |
| Status | ○ 🕘 Pending         ⦿ ⊘ Complete – Made Contact | |
|        | ○ ⊘ Cancelled       ○ ⊖ Complete – No Contact | |
| Description | | |
| Attachments | Used 0 article(s) | |

[ Cancel ]  [ Follow up> ]  [ Finish ]

Done                          🔒 🌐 Internet

Fig. 8

CONTACT RELATIONSHIP SYSTEMS AND METHODS

FIELD OF THE INVENTION

The invention generally relates to systems and methods for establishing and managing relationships with business contacts. More particularly, the invention relates to systems and methods for retrieving and providing information to business contacts, and providing users of the systems feedback with respect to the frequencies of correspondence with these contacts.

BACKGROUND OF THE INVENTION

Customer Relationship Management (CRM) systems play an important role in personalized sales and marketing strategies with the goal of creating business opportunities. These systems can be used to search the Internet for articles that may relate to contacts of the users of the systems for the purpose of enhancing communication between the users and their contacts. Generally, the searches are directed toward keywords or phrases that may be associated with a contact. These systems initiate the searches for contact related articles at the demand of the user. Once the demand is given by the user to search for contact related articles, the systems access Internet sites and scan those sites for articles that contain/match the desired keywords. After the systems have retrieved any potentially relevant articles and matched them with the particular contacts according to the keywords, the user may then review those articles to determine whether to forward such articles onto the associated contact. However, the problem with current CRM systems that search the Internet for articles is that the searches return results that are often outdated. For example, a search for "Vince Smith" may return results including a 15 year old article. Moreover, each time a search is performed for "Vince Smith," the same 15 year old article (e.g., that which was previously reviewed and eliminated by the user) would be returned with the results. Such searching results in numerous irrelevant articles and causes the user of such a system much time in review/filtering efforts.

Further, conventional CRM systems fail to record and store any interaction/correspondence between the user and its contacts regarding the related articles or other correspondence, or alert the user of needed correspondence. Accordingly, systems and methods for establishing and managing relationships with contacts that provide the user information for contacts and feedback with respect to contacts are needed.

SUMMARY OF THE INVENTION

Accordingly, the invention is intended to address and obviate problems and shortcomings and otherwise improve previous systems and methods of creating and maintaining relationships with contacts.

To achieve the foregoing, one embodiment of the invention generally relates to A contact relationship system comprising an information monitor for accessing and retrieving information available from an external source, a database for storing the retrieved information and for storing a keyword associated with profile data related to a contact, an information filter for matching the retrieved information with the keyword each time the retrieved information is retrieved from the external source and a display for displaying to a user a list of the retrieved information related to the contact.

To further achieve the foregoing, another embodiment of the invention generally relates to a contact relationship system including a database for storing correspondence between a user and at least one contact, a nurture level indicator having a nurture display changeable according to frequency of the correspondence with the contact, wherein the database comprises preset commands for notifying the user when the correspondence with the contact does not meet the preset commands.

To further achieve the foregoing, another embodiment of the invention generally relates to a method of managing relationships with contacts comprising a database for storing correspondence between a user and at least one contact, providing a nurture level indicator for indicating actual frequency of the correspondence over time with the contact and displaying to the user a prompt when the actual frequency of the correspondence does not meet expected frequency of correspondence.

To further achieve the foregoing, another embodiment of the invention generally relates to a contact relationship system including a database for storing retrieved information and actual correspondence between a user and a contact, an information filter for matching the information to the contact, a nurture level indicator changeable according to an expected frequency of the correspondence with the contact and a display for displaying to a user a list of the information related to the contact and the nurture level indicator.

To further achieve the foregoing, another embodiment of the invention generally relates to a method of managing relationships with contacts comprising storing retrieved information and correspondence between a user and a contact, matching the retrieved information to the contact, providing a nurture level indicator changeable according to actual frequency of the correspondence with the contact and displaying to a user a list of the retrieved information related to the contact and the nurture level indicator.

BRIEF DESCRIPTION OF THE SEVERAL VIEWS OF THE DRAWINGS

The following detailed description of specific embodiments of the invention can be best understood when read in conjunction with the following drawings, where like structure or method is indicated with like reference numerals and in which:

FIG. 4 is a schematic illustration of a screen shot of a contact profile data display in accordance with one embodiment of the invention;

FIG. 6 is a schematic illustration of a screen shot of a retrieved information list in accordance with one embodiment of the invention;

FIG. 8 is a schematic illustration of a screen shot of a manual correspondence record display in accordance with one embodiment of the invention;

Figure 1:
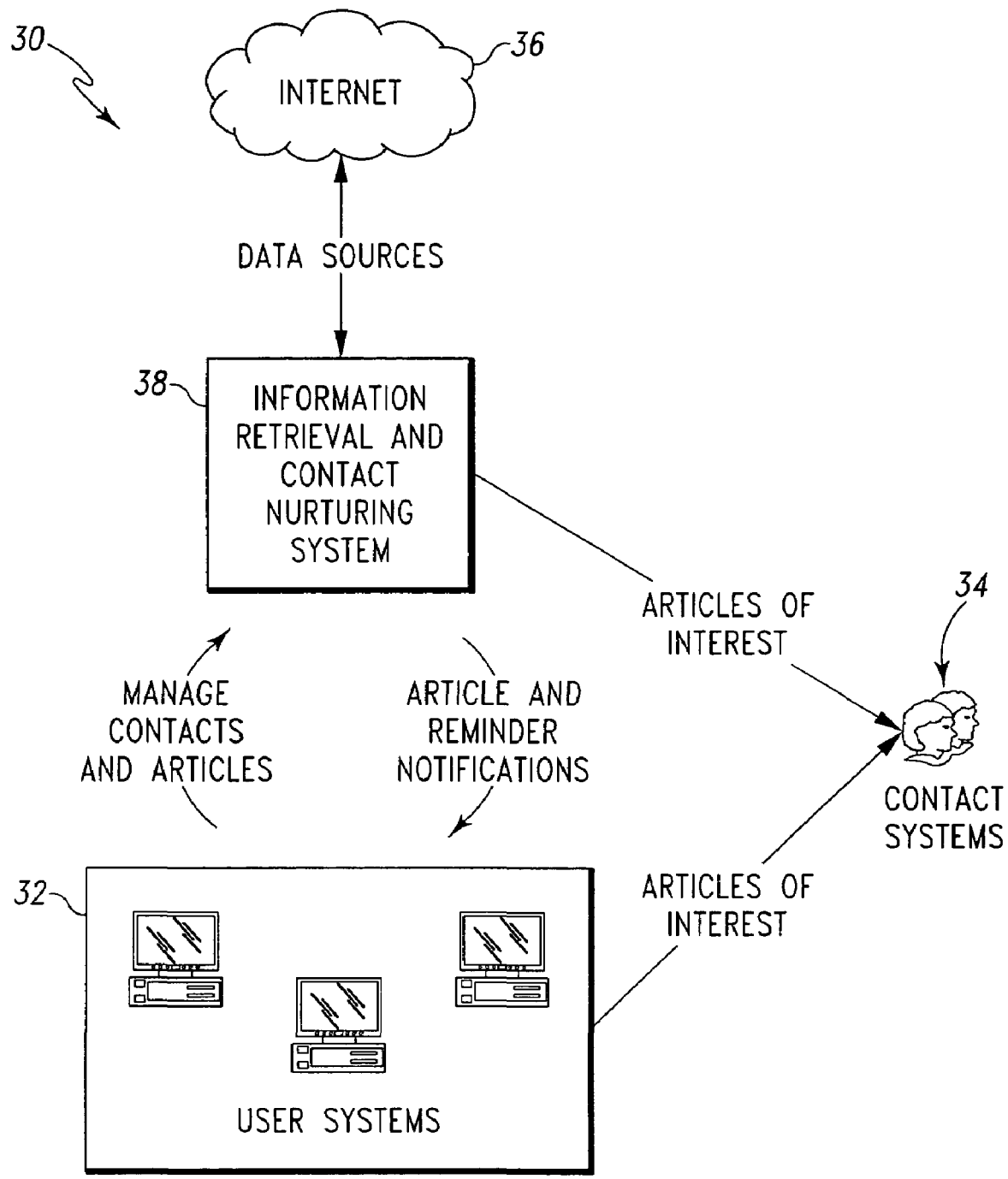
FIG. 1 is a schematic illustration of an operating environment including the contact relationship system in accordance with one embodiment of the invention.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION OF THE INVENTION

As illustrated in the attached figures and described herein, the invention generally relates to systems and methods for establishing and managing relationships with business contacts (i.e., persons and/or entities for which a user has an interest in corresponding). More particularly, the information retrieval and contact relationship systems and methods described herein help the user identify and manage information relevant to a particular contact's interests as well as provide the user feedback with respect to frequency of contact interaction. Embodiments of the invention include an information retrieval and contact relationship systems that generally comprise (1) an information retrieval system for searching for and matching information responsive to predetermined search criteria that is related to a particular contact's interests; and (2) a contact nurturing system that may provide one or more of feedback to a user regarding frequency of interaction with a contact and/or need for follow-up correspondence. The information retrieval systems and contact nurturing systems may be referred to herein as "IRCN system" or summarily as a "contact relationship system."

As illustrated in the figures and described herein, IRCN system may be hosted by and available through an Application Service Provider (ASP). In such a system, users of the system can log on to a remote site where information regarding a user's contacts, as well as information retrieved and related to individual contacts, may be hosted and stored on an ASP interactive database. In such systems, security measures may also be implemented to restrict access to authorized users such that when more than one user is authorized to access the IRCN system, each user may access only that information related to the contacts of that user. Further, such access to the database may be restricted by requiring the user to enter system-authorized usernames and passwords. However, it should be understood that the systems described herein may be provided as dedicated software that can be loaded on a user computer, or may be provided as a data source for other commercially available applications, thereby eliminating or diminishing the role of the ASP. Accordingly, while the description discusses the systems of the invention as being hosted by an ASP, the invention should not be limited to such applications.

Figure 2:
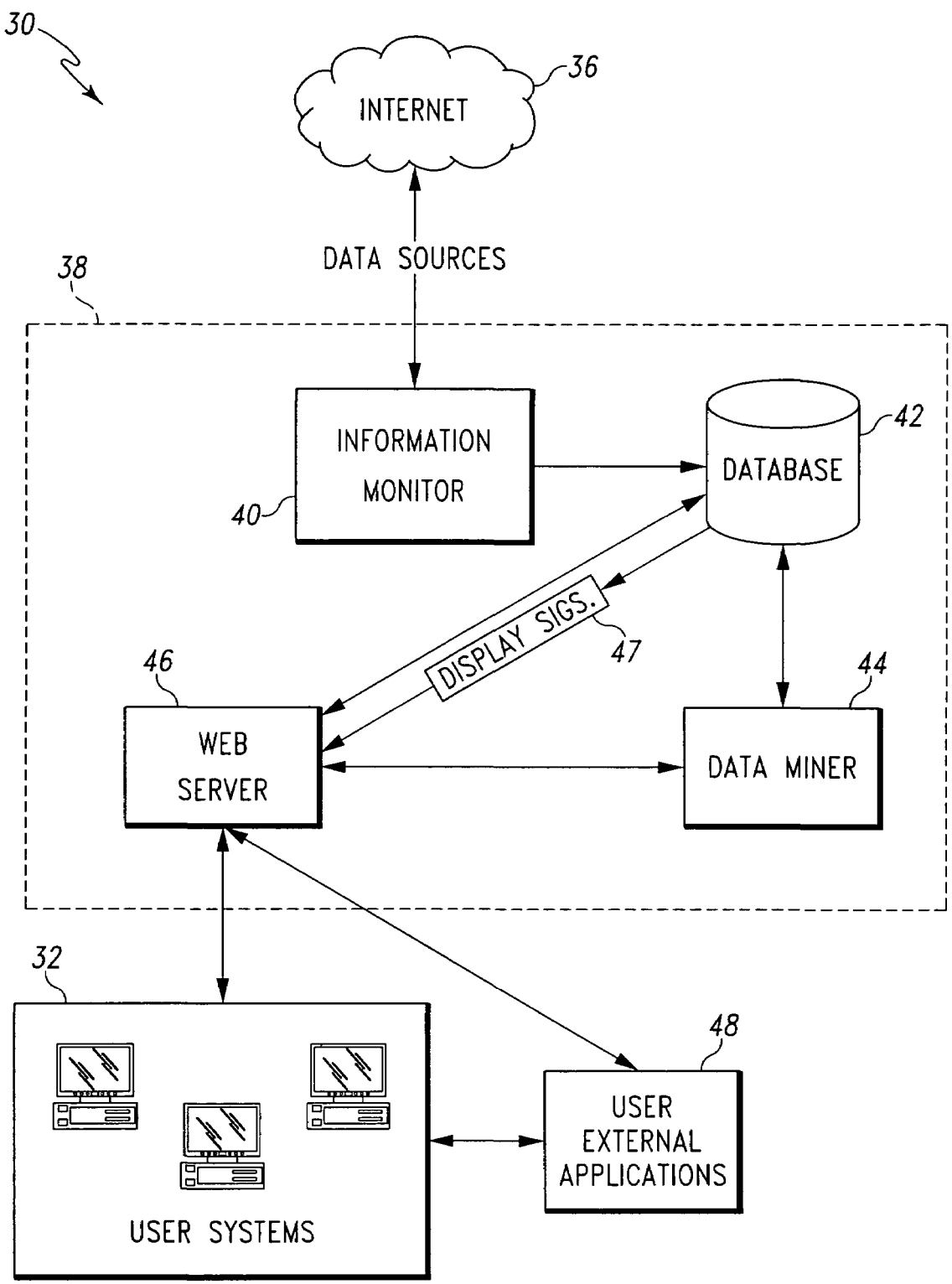
FIG. 2 is a schematic illustration of the contact relationship system in accordance with one embodiment of the invention.

Referring to the figures, FIGS. 1 and 2 illustrate an IRCN system 30 in accordance with one embodiment of the invention. The IRCN system 30 may be hosted by an ASP and accessed through the internet by a variety of users and user systems 32 for managing relationships through correspondence with a contact at contact systems 34. As illustrated, IRCN system 30 is in communication with the Internet 36 and a user system 32. As used herein, a "user" may refer to any individual, group or computer system that utilizes the systems of the invention to manage the contact relationships and business opportunities described herein. As used herein, a "contact" may refer to any leads, customers, clients, potential clients or other persons or groups that the user has an interest in establishing and managing a relationship. As used herein, "contact systems" may refer to any communication device of a contact, including computer, fax or telephone, or simply direct interpersonal communications.

Referring specifically to FIG. 2, IRCN system 30 may comprise a central contact module 38. It is contemplated that the central contact module 38 will comprise hardware and software to enable operation of the systems described herein, including the ability to retrieve information related to specific contacts and provide communication or feedback to users. In one embodiment, central contact module 38 may comprise an information monitor 40, a database 42, an information filter 44, and a web server 46. Generally describing each component in the alternative, the information monitor 40 may be in communication with Internet 36 and database 42 and comprise any standard information monitor or programmable web service that accesses information directly through a web portal. The information monitor 40 is configured to link the Internet 36 and other such external sources to the IRCN system 30. The Internet sources 36 accessed by the monitor 40 typically include, but are not limited to news, magazine, and blog sites. It is contemplated that the monitor 40 will continuously monitor the internet for RSS (i.e., Really Simple Syndication) feeds for information newly posted to those Internet sources 36.

The monitoring/retrieval conducted by the information monitor 40 can be open in that all RSS feeds available through any particular web site requested would be automatically accepted. When any newly posted articles are discovered on the Internet sources 36 or web sites, the information monitor 40 may retrieve those articles by downloading them to the database 42 of the contact module 38. The monitoring of the Internet sources 36 may be achieved through the monitor 40 accessing these Internet sources 36 at regular time intervals or through continuous monitoring. The regular time intervals may occur according to a default timing of the contact module 38 or to a timing determined by the system manager. In another embodiment, users may determine time intervals for searching and type of information searched and retrieved. It is contemplated that once the feeds or articles are retrieved, the same feeds or articles will not be retrieved again, unless newly posted by the provider. In this way, IRCN system only retrieves new articles/information in contrast to prior systems that often retrieve the same, outdated articles during each search.

Database 42 can be configured to store (1) programmable instructions for operating the IRCN system 30, (2) the information or articles retrieved by information monitor 40 and (3) profile data for each of the user's contacts. In another embodiment, a plurality of databases may be utilized to store the aforementioned information. The profile data may include, for example, personal information of the contact such as home/business addresses, phone numbers, and email addresses. In addition, the profile data can include one or more keywords and/or phrases that may be used to search the retrieved information or articles stored in the database 42. The keywords and/or phrases can be contact specific and can generally describe a contact's business-related information (i.e., a contact name, a company name, a geographical location, and/or a business industry) or particular interest (i.e., sports and hobbies).

Figure 3:
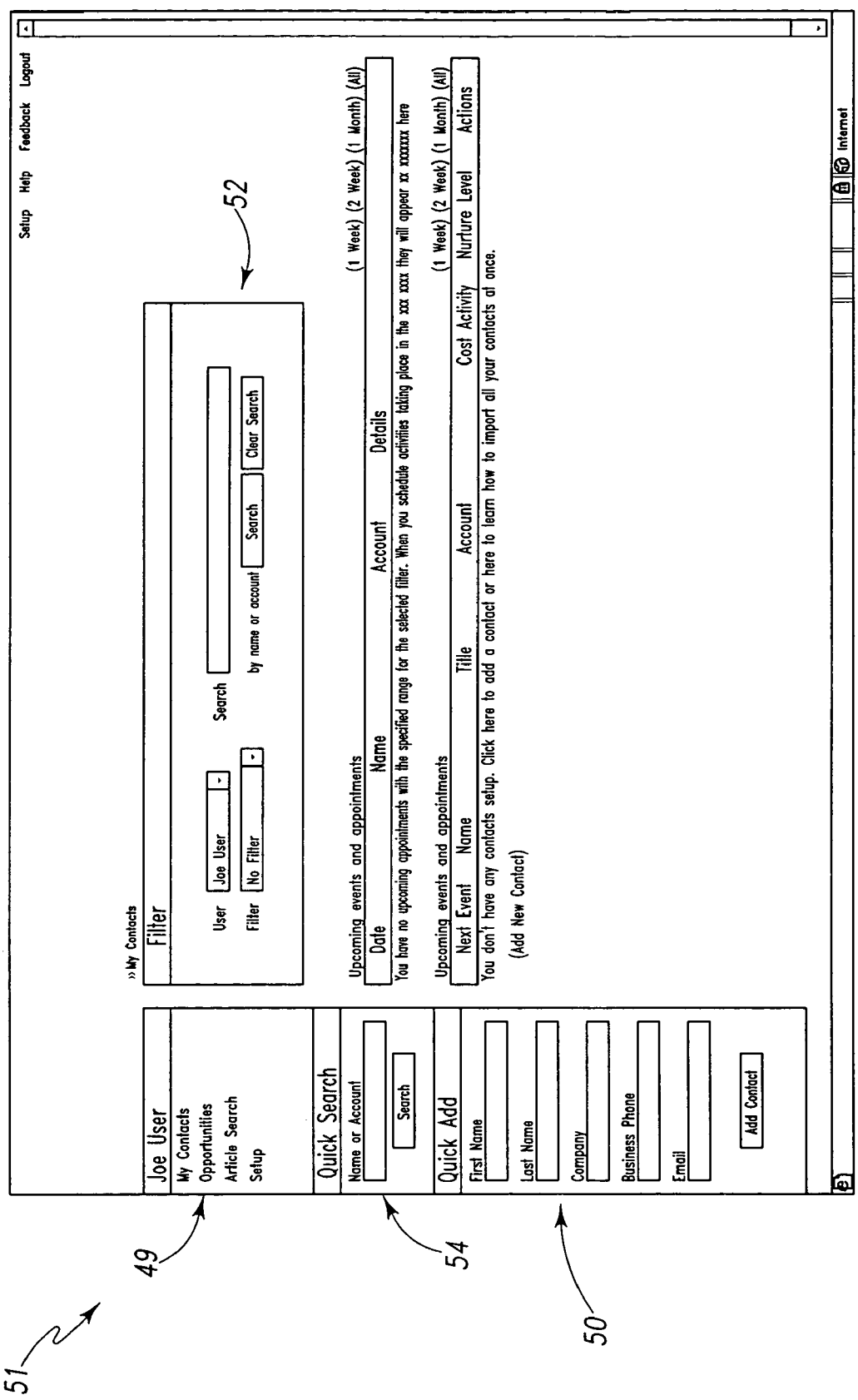
FIG. 3 is a schematic illustration of a screen shot of a user contacts display in accordance with one embodiment of the invention.

Still referring to FIG. 2, the profile data may be directly imported into the database 42 from the user system 32 by uploading the data from an external application 48, such as an electronic address book, a CRM application, ERP, SFA, or other electronic contact information storage devices. Accordingly, the contact relationship system or IRCN system 30 of the invention can be configured to interface specific user systems and external applications. Where the system is an ASP, it is contemplated that all information relating to profile data will be stored in the ASP database. As shown in FIG. 3, if the user does not have an external application that can interface with the IRCN system, the user (through its user system 32 logged on to the IRCN system) may manually enter the profile data directly into the database 42 by inputting such data into profile data fields 50 of the "My Contacts" page 51. These configurable profile data fields 50 also enable a user to modify existing contact profile data to reflect a contact's change in address, employment, residence, and/or other information. The importing of the profile data from an external application 48 provides a quick and simple approach to adding data for numerous contacts to the database 42, while the manual option may be beneficial where a user desires to add and/or modify just one or a few contacts or related information to the database 42. In addition, database 42 may be configured to automatically link with a particular user system 32 and download updates in profile data established on the user system 32.

Information may be displayed on the user system 32, which as previously discussed is in communication with database 42. Particularly, database 42 may comprise instructions to provide display or display signals 47 to web server 46 (See FIG. 2) that allows information in the system 30 to be viewed at a user system 32. Of course, in another embodiment, where the system comprises dedicated software resident on a user system, the display may comprise the instructions in a database and/or on a user computer terminal.

Information available in database 42, such as profile data and retrieved information described above, may be displayed to the user (e.g., Joe User) on the "My Contacts" page (51 in FIG. 3) of the IRCN system 30. The "My Contacts" page is just one embodiment of numerous possible configurations for displaying contact specific data. As shown in FIG. 3, the "My Contacts" page 51 may comprise user specific links 49 comprising my contacts, opportunities, article search, setup and company settings. Of course, the user specific links can comprise any desired links to information available in the system 30. In addition, IRCN system 30 may enable a user system 32 to search the database 42 by name, keyword, and/or with the aid of a filtering mechanism 52. Filtering mechanism 52 may provide a customizable view of a user's contacts that may be restricted to a specific subset of contacts including, but not limited to critical or high priority contacts as defined by the user. Also, a quick menu 54 may be accessible on the "My Contacts" page (51 in FIG. 3) (and various other pages of the IRCN system 30) to provide data fields that enable the user to search the system 30 for specific contact names or accounts, add new contact profile data, and access other databases available through the system 30 as described herein. In addition, the "My Contacts" page may provide a link to a new profile data page and/or to access each contact's profile data page stored in the database 42 (e.g., the "Contact Overview" page 53 in FIG. 4)

From the My Contacts page, the user (e.g., Joe User) can reach specific contact data by viewing the Contact Overview page for that contact. For example, as illustrated in FIG. 4, the database may display profile data (described above), retrieved information and other specific client information on a "Contact Overview" page 53. The "Contact Overview" page 53 may provide a summary of all information related to a particular contact, including information derived from the retrieval system (discussed above) and the nurturing system (described in greater detail below). Further, the "Contact Overview" page 53 may be configured such that a user may view data recorded specific to each contact. These contact-specific overviews generally provide information such as a contact's addresses, phone numbers, important dates, history of interactions with the user, associated queries run by the user, scheduled further interactions, and notes of personal interest. For example, as illustrated in FIG. 4, this particular "Contact Overview" page 53 includes the contact name 55 (e.g., Joseph Kustomer), keyword queries 56, articles retrieved 58, recent correspondence or activities with the contact 59 (discussed later herein), call schedules 67 and special events 79. In addition, the overview 53 may be printed from the IRCN system 30 by the user at the user system 32.

With contact profile data and retrieved information or articles stored in database 42, the information filter of IRCN system distributes articles/information to each contact having keywords or phrases matched/associated with the article. In this way, the information filter acts as a virtual mail carrier to distribute the articles each time the RSS feeds and associated articles are retrieved. In another embodiment, the IRCN or contact relationship system 30 can search the retrieved information stored in the database (in contrast to automatic distribution) for keywords associated with contact profile data. For example, the information filter can search all information and articles stored for the keywords and matches every article containing such keywords to the specific contact associated with the keyword. These matched articles are also described herein as articles "of interest" and/or "related" to the contacts. Alternatively, the contact relationship system can be programmed to automatically search the database of retrieved information and articles at regular time intervals. The time intervals for searching the database 42 may be directed by the system manager by default or controlled by the user, however, it is contemplated that the IRCN system will automatically distribute articles/information as retrieved as previously discussed. If desired, database 42 may index profile data and retrieved articles to allow for a quicker search of the articles for the keywords associated with the profile data. Thereafter, information filter can automatically match the articles and keywords stored in the database 42. Accordingly, one embodiment of the system provides for automatic distribution of relevant articles to the My Contacts page associated with such contact.

In addition to the searching, retrieving and matching described above, the IRCN system 30 may provide the user with the option of directing and running queries independent of those automatically performed by the information filter in accordance with the keywords set forth in the profile data. Particularly, the user may refine the queries by specifying additional or alternative keywords to the queries. These additional keywords may pertain to other areas of interest of the contacts that may have been recently discovered by the user or have a short time frame of importance. For example, a user may add keywords related to a contact's product line, interests, and/or hobbies. Accordingly, this aspect allows a user to further personalize the information matching process. Moreover, if the user is not satisfied by the initial results of the query, user can further refine the queries to produce more accurate and contact-specific results. For example, user may direct the system search for terms and connectors specified as "all of these words" or "the exact phrase." Alternatively, the user may select a link shown with the initial results for an advanced search using Boolean operators. These Boolean operators generally provide keyword fields in which the user may search the articles for "all of these words," "the exact phrase," "any of these words," or "none of these words."

When the user is satisfied with the results of the search, the search parameters and a resulting article list may be displayed by the system 30 and saved to the database 42.

Figure 5:
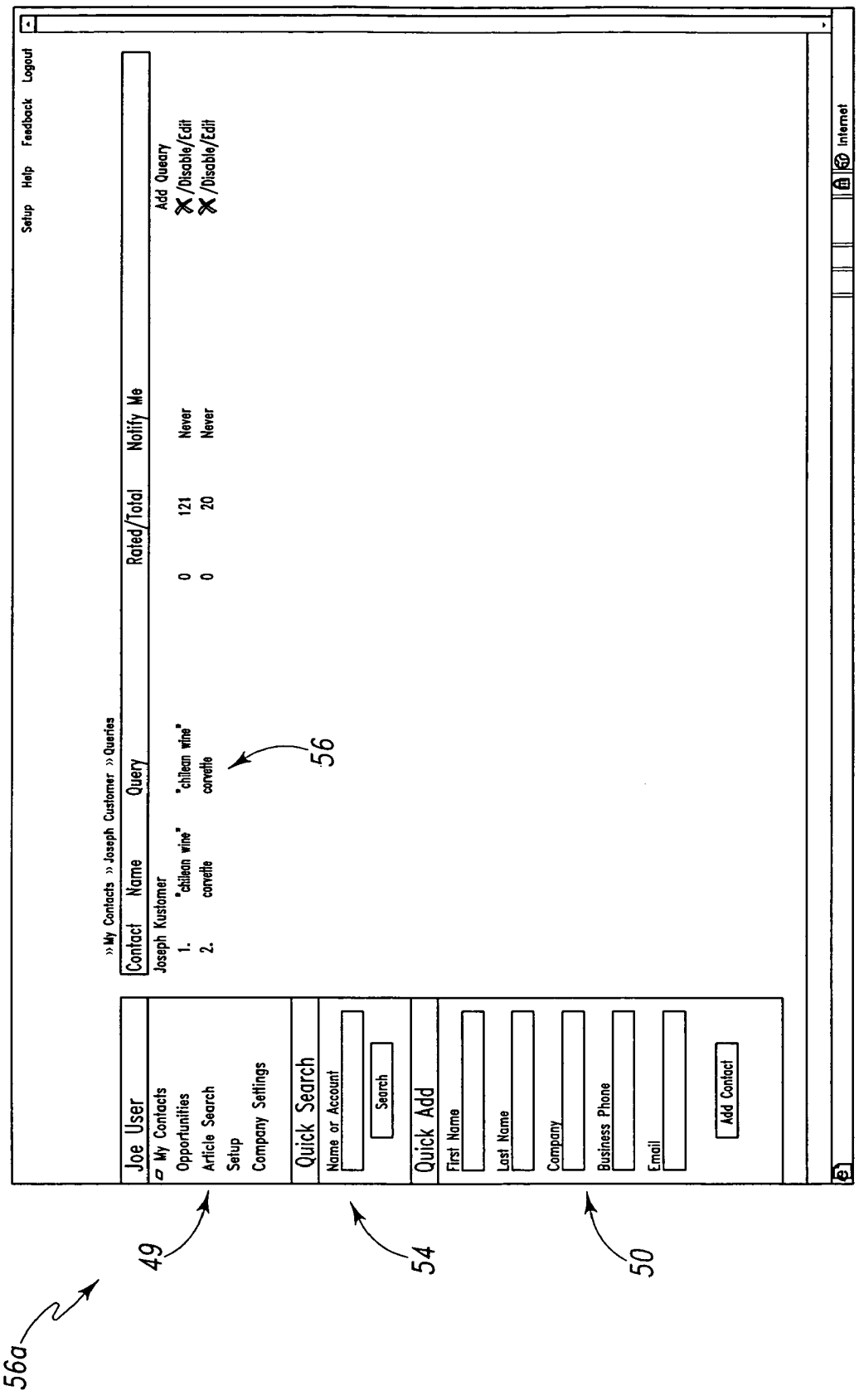
FIG. 5 is a schematic illustration of a screen shot of a query management display in accordance with one embodiment of the invention.

As shown in FIGS. 5 and 6, the user may also review and manage all of the queries 56 performed for each contact on a "Manage Queries" page 56A and view the results of searching (e.g., the information retrieved 58) on the "Article List" page 58A. The information displayed on these pages may include, but is not limited to, the name of the query (e.g., "Chilean wine" and corvette), the keywords searched (e.g., "Chilean wine" and corvette), the number of articles found containing such keywords, the number of said articles rated by the user (described in greater detail below), and whether the user asked to be notified of the results of that query. The individual queries 56 listed on this "Manage Queries" page 56A may be deleted, disabled, enabled, or saved in the database 42 by the user.

Article lists 58 such as that illustrated in FIG. 6, may be stored in the database 42 and be continually updated through monitoring and retrieval of RSS feeds and the eventual matching of newly posted information/articles related to the user's contacts. These lists 58, in addition to other pages if the IRCN system, may be displayed to the user as discussed above. The articles may be presented in a variety of formats. For example, the articles may be presented with a title, a description, a posting date, a hyperlink, and/or the full text, or any combination thereof. The presentation of the article lists 58 may be provided in accordance with the user's preferences and can be readily modifiable through the IRCN system 30. FIG. 6 depicts an article list 58 in accordance with one embodiment of the invention as presenting the title of the articles related to the queries, days since postings on the Internet, and the Internet sources 36. In addition, the user may institute a variety of actions for each article. For example, each article may be deleted from the list, previewed by the user, emailed to one or more contacts at respective contact-systems 34 (discussed later herein), and/or rated by the user (discussed later herein). It is contemplated that additional actions may be added to the article list page as options for the user.

The articles within the article lists 58 matched by the queries 56 generally remain stored in the database 42 and displayable with the related contacts until the database 42 reaches a configurable information quantity limit. More particularly, when a quantity limit is reached, older matched articles may be removed from the database 42 and replaced with new matched articles. While the database 42 generally maintains a default quantity limit of twenty matched articles per query per contact, it allows a user to adjust the limit higher or lower to suit the user's preferences or needs. In addition, the contact module 38 of the information retrieval system may further comprise an email notification option to alert the user of the completion of queries 56 and/or the deposit of articles of interest into the database 42 with the related contacts. The email notification may advise the user of information such as, but not limited to, the Internet posting date of the article, the title of the article, and/or the contact(s) with whom the article is related. The system may be configured such that the user may disable this email notification option. For example, the system may provide the user with a hyperlink in the email notification that may be clicked by the user to disable the notification option.

To further aid in the user's management of the articles, the IRCN system may comprise a rating system 62 that allows the user to rate each article as to its relevancy or quality, or otherwise. For example, the user may keep an article for a later date or differentiate an article by giving the article a higher rating than other articles stored in the database 42. Generally, as also shown in FIG. 6, this rating system 62 comprises ratings of one, two, or three stars that are displayed in the article list 58 next to each rated article. It is contemplated, however, that other embodiments of rating systems may be utilized within the IRCN system 30 and/or the article list 58A. If desired, rated information will not be replaced in the database 42 with newer and/or more relevant information until deleted by the user system 32. This rating system 62 allows a user to further customize and manage the appropriate correspondence with contacts. Particularly, when a user views the articles for the first time, they can assign a ranking so that upon review at a later time, they will not have to completely refresh memory with respect to information the user believes is of particular interest to the contact. In addition, a user can designate all information from a particular source 36 as a high rating so that it is most visible to the user upon review. In one embodiment, the user can set up system so that articles having the highest ranking are automatically sent to contacts according to a determined schedule (discussed later herein).

After reviewing (and potentially rating) the contact related articles, the user may chose to distribute the articles to their associated contacts at respective contact systems 34 (FIG. 1), thus giving the user a reason to correspond with a contact while providing the contact with information of interest. The article list page 58A described above may be configured to easily enable the user to email articles to one or more contacts at respective contact systems 34. For example, by clicking on an envelope, or other email-indicative text or symbol (i.e., next to an article), the IRCN system 30 can direct the user to an email article (other information) screen. On this email screen, the user may prepare an email to user-selected contacts, wherein the article appears as an attachment to the email or as a hyperlink provided in the email.

The user also has the options of requesting that a blind carbon copy of the email be delivered to the user's email account, reviewing the selected article, and/or attaching additional or different articles to the same email. The user can scroll through an article list and select whichever, and as many, articles the user would like to send with the email to the selected contacts. The user may also preview and modify the email prior to sending it to the selected contacts. Users that prefer to use external email applications (ie: Outlook, Yahoo Mail, Gmail, Blackberry, ect.) to correspond with contacts have the option of adding the IRCN system 30 as one of the email recipients in the blind carbon copy (bcc) field of the email. The IRCN system 30 will associate the email with one or more recipient contacts by matching email address and record the email as correspondence in contact's "Activities" (reference 59 in FIG. 4). Likewise, email correspondence originating from contacts can be forwarded to the IRCN system 30 for recording two way communication and dialog.

As previously discussed, systems of the invention include a contact relationship system and methods for managing contacts that generally may include (1) an information retrieval system for searching for and matching information responsive to predetermined criteria based on a particular contact's interests (i.e., profile data); and (2) a contact nurturing system that may provide one or more of feedback to a user regarding frequency of interaction with a contact and/or need for follow-up correspondence with a particular contact. The foregoing discussion has been with respect to the information retrieval system of the IRCN system. The contact nurturing system can work in tandem with the information retrieval system described herein to provide a system capable of enhanced management of client contacts and relationships.

As opposed to the information retrieval system that stores profile data and retrieved information and matches the same, the contact nurturing system of the invention manages the interaction (and the frequency thereof) between the user and his/her contacts.

Figure 7:
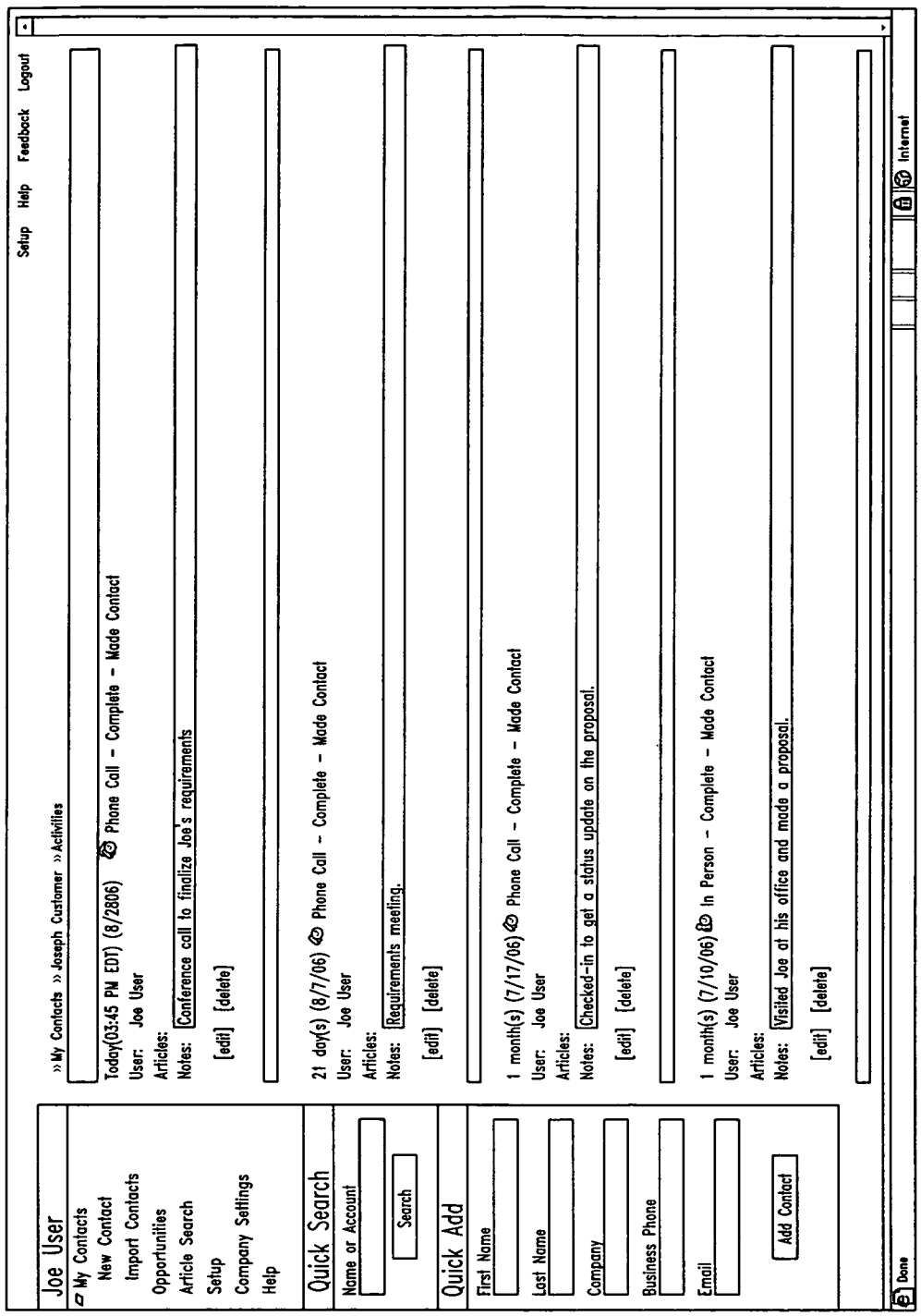
FIG. 7 is a schematic illustration of a screen shot of recorded correspondence in accordance with one embodiment of the invention.

The contact nurturing system can utilize the database 42 of the IRCN system of FIGS. 1 and 2 as discussed herein. Referring to FIGS. 2, 4 and 7-10, database 42 may comprise programmable instructions for storing correspondence with a contact (see reference 59 on Contacts Overview page 53 of FIG. 4), providing feedback relating to correspondence with contacts and scheduling future correspondence with contacts. For example, with respect to storage of correspondence with contacts, database 42 may maintain an up to the moment, contact specific historical account of all of such interactions made between the user and each contact. Referring to FIG. 7, such information regarding correspondence can be stored into the "Activities" page 59A of IRCN system. As illustrated therein, information regarding correspondence such as phone calls, in-person meetings, etc. can be stored for display to and management by the user. The IRCN system also provides a tool for recording important dates for each contact. For example, the user may record dates such as a contact's birthday and/or anniversary, or any other important dates. These important dates 79 may be posted on the "My Contacts" page 53 of the IRCN system 30 as reminders to the user of those dates.

For emails such as those described above, the IRCN system 30 may be configured to automatically record the email, or information related to the email such as the date and time of the email, to which contact(s) the email was sent, and the subject of the email. It should be understood that the system can be configured to record and store correspondence related to information retrieved, but also related to general business correspondence that does not include information retrieved. Moreover, for correspondence made over the phone, fax, letter, or otherwise (except for email which is linked to the IRCN system), it may be necessary for the user to enter the occurrences of such correspondence into a "New Activity" page 64 (shown in FIG. 8) of the IRCN system 30 under the name of the contact with whom such communication was made. The "New Activity" page enables the user to create a new correspondence with a contact or to modify a previously recorded correspondence by entering information such as the date, time, nature (phone, email, letter, otherwise), status (pending, cancelled, completed with or without actual interaction with contact), and/or subject matter of the interaction or correspondence, as well as any involved articles. The manual recordation of correspondence into the database 42 through the "New Activity" page 64 ensures an accurate historical account of user/contact non-IRCN system linked interactions. Entry of manual and automatic correspondence allows the contact nurturing system (and ultimately the IRCN or contact relationship system) to track and evaluate how a user is managing or nurturing a relationship with a contact so as to provide feedback and suggestions, such as follow-up reminders to the user for future growth and management of the contact.

The contact relationship system of IRCN system is also configured to provide feedback to the user regarding the quality and quantity of correspondence with a particular contact. As discussed above, the prior correspondence with contacts can be recorded in a database of the IRCN system. Feedback to the user regarding correspondence with contacts can be delivered in any form, including e-mails or any other visual display. In one embodiment, the contact relationship system can include one or more nurture level indicators indicating frequency and consitency of correspondence overtime between a user and a contact (e.g., nurture display), as well as other indicia such as last contact, call goals, call target, etc. Without intending to be limited by theory, it is believed that over time the "nurture value" of a particular instance of a correspondence (e.g. a phone call) diminishes. For example, a call made yesterday has more nurture value than a call last month, Additionally, after 6 months the nurture value of that call could have diminished completely. Moreover, one can not make up for lost time. In other words, if you have neglected a contact for 3 months, you cannot undo that by calling 6 times today. In fact, it is believed that unless a substantial amount of time (on the order of two weeks) has passed since the first call/meeting/etc., there is no additional nurture value in the subsequent calls. Accordingly, the IRCN system can be set up to provide feedback to a user of the need for consistent correspondence over time.

In one embodiment for example, to determine feedback, IRCN system may calculate a user's nurture level for a specific contact by examining the past six months starting present today. This can be done by dividing the six month time period into 12 two-week intervals. It is noted whether the user has recorded at least one form of correspondence with the contact in each interval in calculating the nurture level as an accumulation of the following scores:

+40 if the user contacted the client in either the $1^{st}$ or $2^{nd}$ intervals.

+20 if the user contacted the client in both the $1^{st}$ and $2^{nd}$ intervals.

+25 if the user contacted the client in either the $3^{rd}$ or $4^{th}$ intervals.

+10 if the user contacted the client in both the $3^{rd}$ and $4^{th}$ intervals.

+20 if the user contacted the client in either the $5^{th}$ or $6^{th}$ intervals.

+5 if the user contacted the client in both the $5^{th}$ and $6^{th}$ intervals.

+10 if the user contacted the client in either the $7^{th}$ or $8^{th}$ intervals.

+2.5 if the user contacted the client in both the $7^{th}$ and $8^{th}$ intervals.

+2.5 if the user contacted the client in either the $9^{th}$ or $10^{th}$ intervals.

+2.5 if the user contacted the client in both the $9^{th}$ and $10^{th}$ intervals.

+1 if the user contacted the client in either the $11^{th}$ or $12^{th}$ intervals.

The higher the score, the higher the nurture level, meaning that the contact/client is being nurtured well. Accordingly, the IRCN system may record frequencies of correspondence over time stored in the database and adjust the displayed nurture level indicators specific to each of the contacts according to the above formulas. Of course, it should be understood that any point values, formulas or assessments may be used to configure how nurture levels will be displayed and or updated.

A contact's nurture level is updated every time a user records, modifies the date or status of, or deletes a correspondence. To understand how the nurture level can work utilizing the above-referenced point scales, the frequency of correspondence over time for Clients A-D is listed in the following table (in the following table an "x" indicates correspondence):

| Client/Interval | 1 | 2 | 3 | 4 | 5 | 6 | 7 | 8 | 9 | 10 | 11 | 12 | Nurture Level |
|---|---|---|---|---|---|---|---|---|---|---|---|---|---|
| Client A | x | x | x | x | x | x | x | x | x | x | x | x | 138.5 |
| Client B | x |   | x |   | x |   | x |   | x |   | x |   | 98.5 |
| Client C | x |   |   | x |   | x |   | x |   |   |   |   | 77.5 |
| Client D |   |   | x |   |   |   | x |   |   |   | x |   | 39 |

Client A has been contacted once every two weeks over the past 6 months and has the highest possible Nurture Level. This reflects a very strong relationship, that the user has put in a maximum effort, and the fact that when the client has a need the user will likely come to mind. For the best relationship to result, it is expected that the user will establish correspondence over time to maintain the highest possible score (e.g., here, 138.5). Client B has been contacted once every month. The user has expended a high-level of effort, has a strong relationship, and can expect to come to mind when the contact has a need. Client C has been contacted once every 6 weeks, the minimum effective frequency (over the six-month period). The user has shown a medium level effort, has a familiar relationship, and can expect to be recognized when contacting the client. Client D has been contacted once every 2 months. This nurture level represents a lower effort and lukewarm relationship. It is important to note when discussing the strength of a relationship that this refers to the business relationship. The IRCN system does not presume to measure the degree to which a client "likes" a user or the attitude a client holds toward a user. In simple terms, it measures the effective effort a user puts towards creating and growing a business relationship with a client.

Feedback relative to the frequency of correspondence over time can by displayed to the user through nurture level indicators. Nurture level indicators can be graphically displayed on the "Contact Overview" page (53 in FIG. 4), and/or other pages of the IRCN system. Referring to FIG. 4, one embodiment of a "Contact Overview" page 53 is illustrated. As shown therein, one of the nurture level indicators 70 may be a nurture display 72 provided as a bar indicator similar to that of a download progress indicator. In this embodiment, nurture display 72 illustrates the nurture level of the client as discussed above. The nurture display is filled if the total points for correspondence over time (discussed above) is at a maximum. For instance, a level of 98.5 points may be shown as a gauge ~70% full. In another embodiment, nurture level indicators can be provided as a pie graph or any other indicator. The displayed nurture level indicator and nurture display is changeable so that it may rise and fall based on the actual frequencies of correspondence occurring over a period of time defined by the user. For example, contacts with whom the user corresponds with on a monthly basis will have a higher nurture level indicator display than contacts with whom the user interacts on a biannual basis. As discussed above, the actual frequencies of correspondence occurring over a period of time can be assessed with a point system (preset criteria selected by the system manager) or other indicia, such as those selected by the user (discussed later herein). If desired, the system can be programmed so that when nurture level or nurture display falls below a certain expected point or level, an alert may be delivered to the user.

Further, the displayed nurture level indicators may also comprise indicia representative of aspects other that nurture level, such as last contact indicators 73. These last contact indicators 73 may be provided for indicating passages of time since previous correspondence between the user and the contact. In addition, nurture level indicators may comprise recent activity indicators 74. For example, the recent activity indicators 74 may change in number, by changing colors, or otherwise as the number of days/months pass since the last interaction or correspondence with the associated contact was made. In one embodiment, the recent activity indicators 74 can be configured as small arrows that are displayed adjacent the displayed nurture level indicators 70. The arrows may also enable the user to quickly determine which contacts have recently been contacted by the user.

Figure 9:
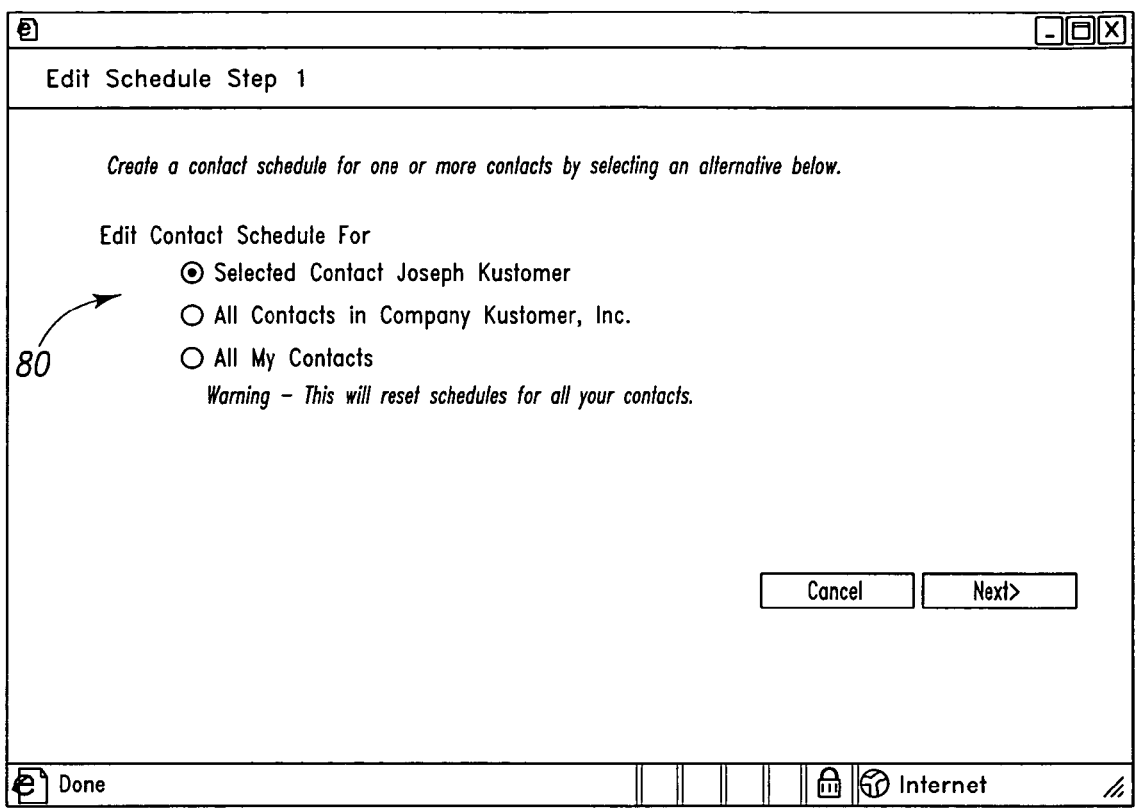
FIG. 9 is a schematic illustration of a screen shot of a contact schedule display in accordance with one embodiment of the invention.
Figure 10:
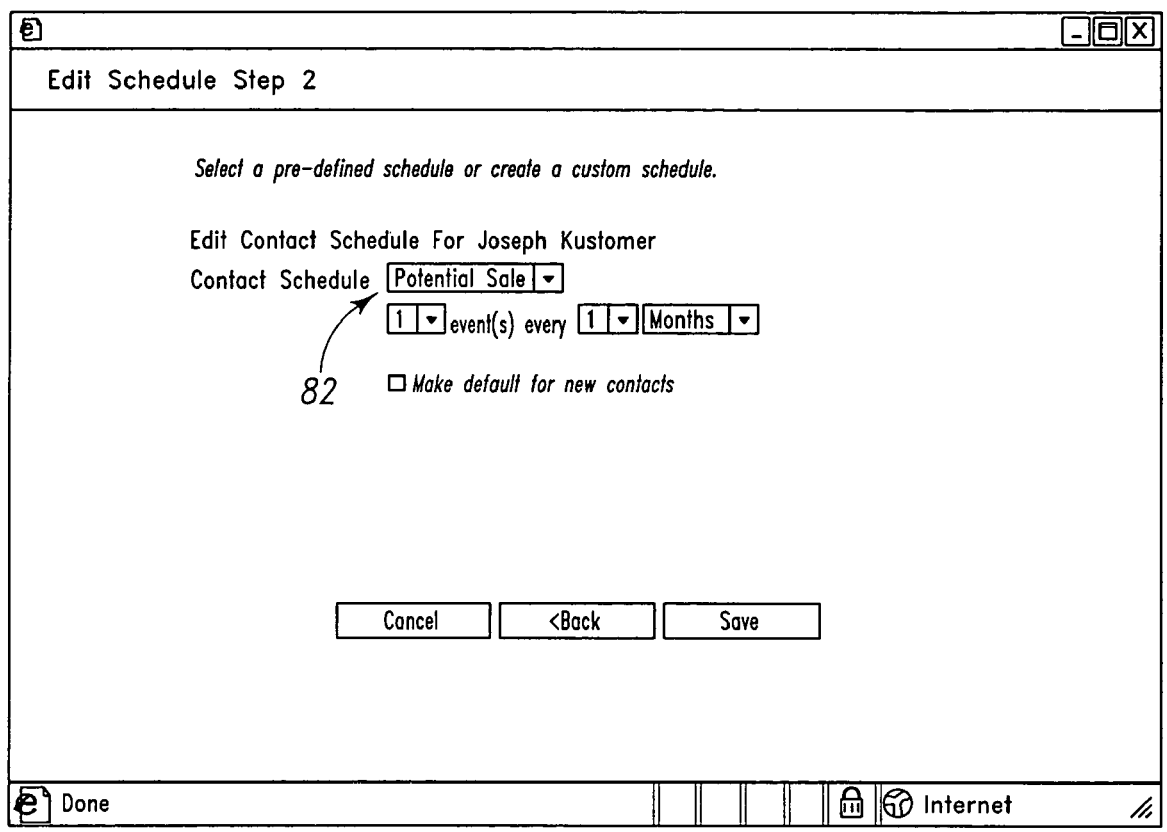
FIG. 10 is a schematic illustration of a screen shot of a contact schedule display in accordance with one embodiment of the invention.

Nurture level indicators can also display information to the user in accordance with preset instructions or commands determined by the user (in contrast to the point scale preset instructions determined by the system manager). Moreover, the instructions may be specific to each contact of the user. In this manner, the contact relationship system (or the IRCN system) of the invention can be configured to prompt or notify the user that correspondence with any contact does not meet the user specified preset instructions/commands. Referring to FIGS. 9 and 10, contact schedule pages 76 and 78 allow a user to select a contact 80 and establish a contact schedule 82 according to the type of contact a certain individual, group or entity represents. For example, as illustrated in FIG. 9, a user can establish or edit the contact schedule for Joseph Kustomer, all contacts in Kustomer, Inc. or all contacts in "My Contacts" (51 in FIG. 3). Referring specifically to FIG. 10, Joseph Kustomer may be any category of contact including, for example, a "Hot to Buy," "Potential to Sale," "Keep Warm," "Keep in Touch" or "Keep Alive," and accordingly, the proper contact schedule 82 can be set. It is contemplated that the contact category will determine the contact schedule (the schedule of how often correspondence should be made with the contact), and thus, influence the nurture level indicators accordingly. For example, a "Hot to Buy" contact category may require much more frequent correspondence than a "Keep Alive" contact category. As illustrated in FIGS. 4 and 10, Joseph Kustomer is listed with a call target 75 as a "potential sale" (one call every one month) and a next contact 76 of one month. According to the preset criteria for a potential sale, the contact would be scheduled to receive one correspondence per month. Said differently, the system is set to an expected correspondence of one correspondence per month. As illustrated, however, although Joseph Kustomer is a potential sale, the schedule of correspondence can still be manipulated. It should be understood that a user can program any number of categories specific to their own preferences, along with the schedule of correspondence and nurture level indicators associated with those categories.

The IRCN system monitors and analyzes the nurture levels determined by the system manager and the call target categories determined by the user (collectively and individually, referred to as preset instructions) to determine frequencies at which the user should be corresponding with each contact. The IRCN system also monitors and analyzes the correspondence recorded in conjunction with the preset instructions to provide feedback to the various nurture level indicators (e.g., whether a contact needs to be contacted or nurtured). With regard to the call target nurture level indicator, this indicator may countdown the time to the next scheduled interaction between the user and the contact, in accordance with the preset schedules described above. Thus, when the timer or indicator reaches zero time remaining or falls below a certain point, the nurture indicator and nurture display will prompt the user that correspondence with that contact is due. With regard to the nurture display, as the nurture level falls according to the preset instructions/commands/criteria discussed above, the system may provide an alert or other notification/prompting of such a event.

If desired, the IRCN system can be programmed to provide notification to a user when a particular nurture level indicator (e.g., a nurture display 72 or next contact 76) gets low or when an important date 79 (discussed above) approaches. What constitutes a low nurture level indicator can be specifically determined by the user or set as a default in the IRCN system. Particularly, the system can be configured so that when a nurture level indicator gets low (or reaches zero) or when an important date approaches the user will receive e-mail notification of such event. The user can then log into the IRCN system and scan for retrieved articles (a reason to call), or simply follow-up with the contact on their own. After a user corresponds with a contact, the nurture level indicator will increase (nurture display) or return to normal (next contact) illustrating that the contact(s) are being properly managed, at least according to the preset criteria.

The IRCN system of the invention may also be configured for accessibility by businesses seeking to manage and monitor usage of the system by its employees. For example, a brokerage house authorized to use the systems described herein may seek to monitor the activity of its individual brokers, or to have access to profile data of any one of its broker employees. When utilized in this manner, the IRCN system may be configured to organize individual users into user groups that reflect the employer's organizational structure. These groups may be created, modified, and deleted by the business.

Having described the invention in detail and by reference to specific embodiments thereof, it will be apparent that modifications and variations are possible without departing from the scope of the invention defined in the appended claims. More particularly, although some aspects of the invention are identified herein as preferred or particularly advantageous, it is contemplated that the invention is not necessarily limited to these preferred aspects of the invention.

What is claimed is:

1. A contact relationship system comprising:
   an information monitor for accessing and retrieving newly posted information available from an external source without reference to a keyword, wherein said retrieved information comprises RSS feeds from said external source;
   a database for storing said retrieved information and for storing a keyword associated with profile data related to a contact;
   an information filter for automatically matching said retrieved information with said keyword each time said retrieved information is retrieved from said external source; and
   a display for displaying to a user a list of said retrieved information related to said contact.

2. The contact relationship system of claim 1, further comprising a rating system for rating said retrieved information.

3. The contact relationship system of claim 1, wherein said profile data is electronically imported into said database by said user.

4. The contact relationship system of claim 1, further comprising:
   a database for storing correspondence between a user and at least one contact;
   a nurture level indicator changeable according to frequency of said correspondence with said contact;
   wherein said database comprises preset commands for notifying said user when said correspondence with said contact does not meet said preset commands.

5. A contact relationship system comprising:
   a database for storing correspondence between a user and at least one contact;
   a nurture level indicator having a nurture display changeable according to frequency of said correspondence with said contact, wherein said nurture display is filled if said frequency of said correspondence meets a preset threshold;
   wherein said database comprises preset commands for notifying said user when said correspondence with said contact does not meet said preset commands, wherein said preset commands relate to a predetermined schedule of desired correspondence with said contact.

6. The contact relationship system of claim 5, wherein said preset commands comprise instructions for assigning points based on said frequency of said correspondence over time.

7. The contact relationship system of claim 5, further comprising:
   an information monitor for accessing and retrieving information available from an external source;
   a database for storing said retrieved information and for storing a keyword associated with profile data related to a contact;
   an information filter for matching said retrieved information with said keyword when said retrieved information is retrieved from said external source; and
   a display for displaying to a user a list of said retrieved information related to said contact.

8. A method of managing relationships with contacts comprising:
   providing a database for storing correspondence between a user and at least one contact;
   providing a nurture level indicator having a nurture display for indicating actual frequency of said correspondence over time with said contact, wherein said nurture display is filled if said frequency of said correspondence meets a preset threshold;
   displaying to said user a prompt when said actual frequency of said correspondence does not meet expected frequency of correspondence, wherein said expected frequency relates to a predetermined schedule of desired correspondence with said contact.

9. The method of managing relationships with contacts of claim 8, further comprising notifying said user when said actual frequency does not meet said expected frequency of correspondence.

10. The method of managing relationships with contacts of claim 8, wherein said database further stores profile data for said contacts.

11. The method of managing relationships with contacts of claim 8, further comprising:
   accessing and retrieving information available from an external source;
   matching said retrieved information with a keyword associated with a profile data; and
   displaying to a user a list of said information related to said profile data.

12. A contact relationship system comprising:
   a database for storing retrieved information and actual correspondence between a user and a contact;
   an information filter for matching said information to said contact;

a nurture level indicator changeable according to an expected frequency of said correspondence with said contact, wherein said expected frequency relates to a predetermined schedule of desired correspondence with said contact;

a display for displaying to a user a list of said information related to said contact and said nurture level indicator.

13. The contact relationship system of claim 12, further comprising an information monitor for retrieving said information.

14. The contact relationship system of claim 12, wherein said database comprises preset commands for notifying said user when said actual frequency of said correspondence with said contact does not meet said expected frequency of said correspondence.

15. The contact relationship system of claim 12, further comprising a rating system for rating said information.

16. A method of managing relationships with contacts comprising:

storing retrieved information and correspondence between a user and a contact;

matching said retrieved information to said contact;

providing a nurture level indicator changeable according to actual frequency of said correspondence with said contact, wherein said nurture level indicator having a first level when said frequency meets a predetermined schedule of desired correspondence with said contact and a second level when said frequency does not meet said predetermined schedule of desired correspondence with said contact;

displaying to a user a list of said retrieved information related to said contact and said nurture level indicator.

17. The method of managing relationships with contacts of claim 16, further comprising notifying said user when said actual frequency does not meet expected frequency of said correspondence.

18. The method of managing relationships with contacts of claim 16, further comprising assigning a call target to said contact indicating expected frequency of correspondence with said contact.

* * * * *